United States Patent
Cimenti

(10) Patent No.: US 6,776,601 B2
(45) Date of Patent: Aug. 17, 2004

(54) DOUGH PORTION CONTROL MACHINE FOR FLOUR AND SIMILAR MATERIALS

(76) Inventor: Antonio Cimenti, Località Fontane n.3, I-33070 Polcenigo (Pordenone) (IT)

( * ) Notice: Subject to any disclaimer, the term of this patent is extended or adjusted under 35 U.S.C. 154(b) by 211 days.

(21) Appl. No.: 09/840,156

(22) Filed: Apr. 24, 2001

(65) Prior Publication Data

US 2002/0155188 A1 Oct. 24, 2002

(51) Int. Cl.$^7$ .................................................. A21C 5/00
(52) U.S. Cl. ................... 425/142; 425/148; 425/192 R; 425/313
(58) Field of Search ............................... 425/142, 148, 425/183, 190, 192 R, 308, 311, 313, 461

(56) References Cited

U.S. PATENT DOCUMENTS

| | | |
|---|---|---|
| 598,404 A | 2/1898 | Weichert |
| 824,008 A | 6/1906 | Gowdy |
| 902,088 A | 10/1908 | Kintner |
| 1,944,464 A | 1/1934 | Richardson |
| 2,578,229 A | 12/1951 | Clement et al. |
| 2,649,618 A | 8/1953 | Rhodes et al. |
| 3,427,003 A | 2/1969 | Schneider et al. |
| 3,606,277 A | 9/1971 | Kader |
| 3,646,894 A * | 3/1972 | Hasten et al. .............. 426/503 |
| 3,787,160 A | 1/1974 | Leister |
| 4,442,131 A * | 4/1984 | Nagy et al. .................. 425/311 |
| 4,734,024 A | 3/1988 | Tashiro |
| 5,190,772 A * | 3/1993 | Conselvan et al. ...... 425/192 R |
| 5,286,185 A * | 2/1994 | Tashiro et al. .............. 425/140 |
| 6,312,246 B1 * | 11/2001 | Pozzobon .................... 425/190 |

FOREIGN PATENT DOCUMENTS

| | | |
|---|---|---|
| EP | 0 532 991 A1 | 3/1993 |
| IT | 01253370 | 9/1991 |

* cited by examiner

Primary Examiner—Robert Davis
Assistant Examiner—Joseph S. Del Sole
(74) Attorney, Agent, or Firm—Oblon, Spivak, McClelland, Maier & Neustadt, P.C.

(57) ABSTRACT

A dough portion control machine for flour and similar materials comprises a dough feeding hopper, a dough extrusion apparatus including first and second a interchangeable dough distributors, a dough weight and dimension apparatus, a dough cutting apparatus, and a extrusion portion control apparatus. The first dough distributor is adapted to cooperate with the dough cutting apparatus and the extrusion dough portion control apparatus to produce dough portions in the range of 0.1–0.7 lb. and the second dough distributor, when interchanged with the first dough distributor, is adapted to cooperate with the dough cutting apparatus and the extrusion dough portion control apparatus to produce dough portions in range of 0.7–1.5 lb. and even heavier.

10 Claims, 3 Drawing Sheets

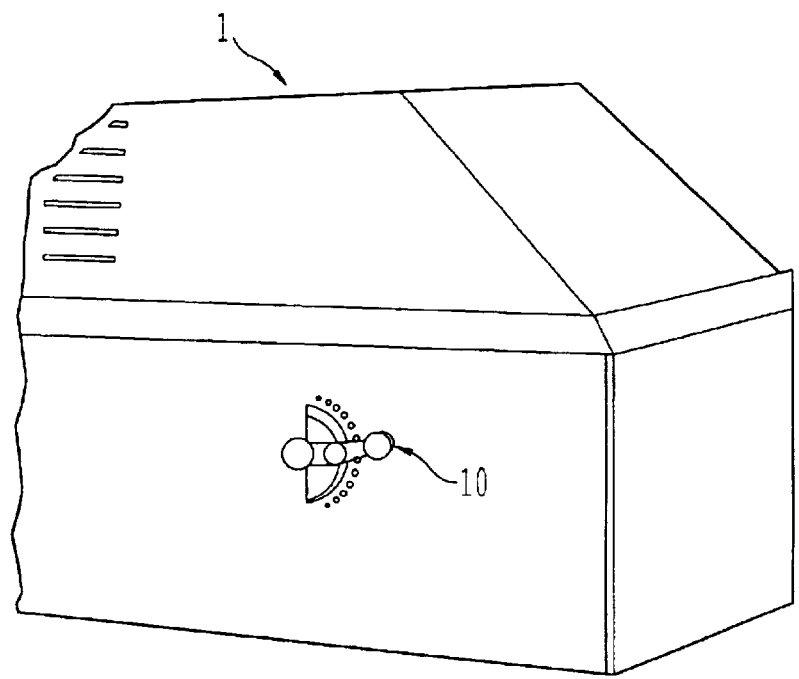
*FIG. 2*
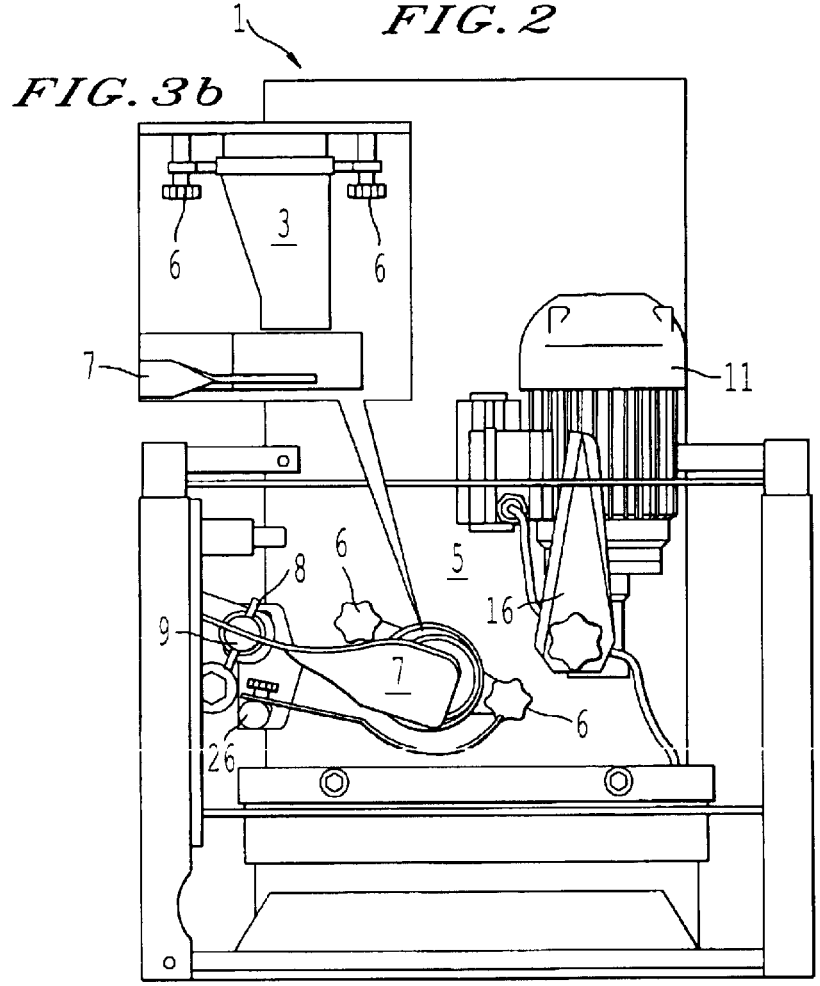
*FIG. 3b*
Fig.3a

DOUGH PORTION CONTROL MACHINE FOR FLOUR AND SIMILAR MATERIALS

BACKGROUND OF THE INVENTION

Field of the Invention

The present invention relates to a dough portion control machine for flour and similar materials, particularly for pizza-restaurants, bakeries etc., comprising a dough feeding hopper, dough extrusion means and dough weight and/or dimension selective control means.

DISCUSSION OF BACKGROUND

Now days pizzas, bread portions and similar are requested for weights up to 1.5 lb. Consequently a plurality of machines adapted to the production of a plurality of pizzas dough portions and bread dough portions are offered to the market of pizza-restaurants, bakeries and so on.

A known machine has been constructed to form dough portions from about 0.1 to maximum 0.7 lb. That machine includes a dough portions weight selection device comprised of an outlet cross section funnel adjustment, which is placed downstream with respect to a screw feeder. A motor driven rotating blade is started across the path of travel of the dough portion through the screw feeder in response to the activation of the motor by a sensor. An operator can independently select different dough portion weights.

Should dough portions of different weight be required, substantially higher than 0.1–0.7 lb., further more sophisticated, expensive and cumbersome machines are necessary.

SUMMARY OF THE INVENTION

A solution is provided by modifying the above mentioned machine so that it may be used to prepare dough portions from 0.1–0.7 lb. to 0.7–1.5 lb. The main advantage of this solution are (1) a reduction in the amount of space needed, —i.e., the reduction in the number of different machines needed, and (2) a substantial cost reduction due to the reduction in the number of different machines needed.

The problem is solved by a machine according to the present invention, which is characterized by extrusion apparatus adapted to co-operate with dough cutting apparatus and with extruded dough portion control apparatus. The extrusion apparatus is adapted to produce, together with the cutting apparatus and with the control apparatus, a dough portion which could be substantially heavier than 0.7 lb. The machine of the present invention includes an extrusion apparatus that is interchangeable with further extrusion apparatus on the same machine structure for dough portion production which could be lighter than 0.7 lb., for instance within a range of 0.1–0.7 lb. The interchangeability of one extrusion apparatus for another extrusion apparatus provides the advantage of providing a machine adaptive to prepare a dough portion comprised within a range of 0.1–1.5 lb. and even heavier.

BRIEF DESCRIPTION OF THE DRAWINGS

The above noted and further characteristics of the invention will be apparent from the following description and the accompanying drawings, wherein:

FIG. 2 is a perspective view of the machine according to the present invention;.

FIG. 3a is a front view of the machine according to the present invention corresponding to the starting phase thereof;

FIG. 3b is an enlargement of a portion of the machine shown in FIG. 3a taken in plan view;

DETAILED DESCRIPTION OF THE INVENTION

Figure 4:
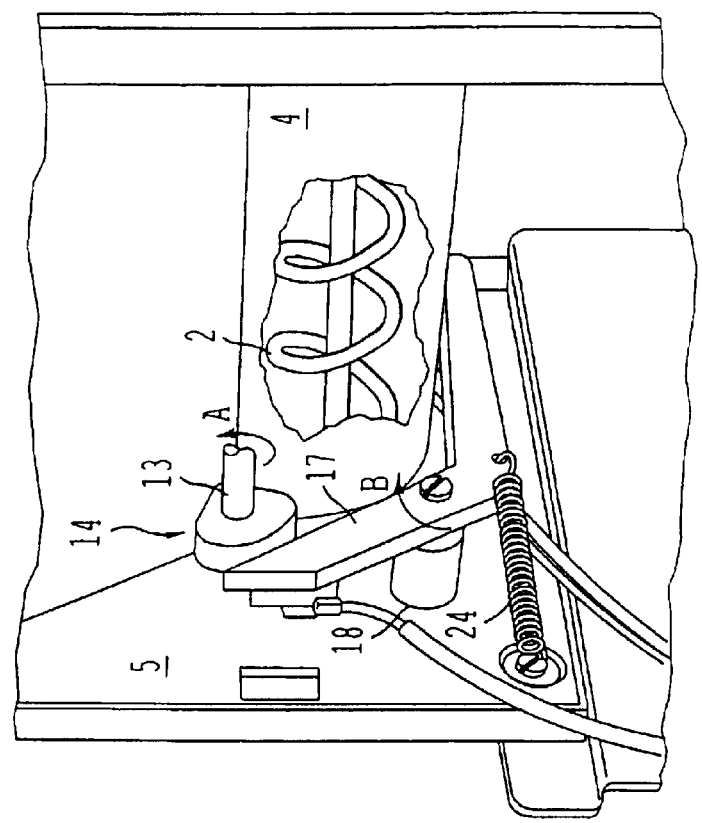
FIG. 4 is a front view of the machine according to the invention corresponding to a second operation phase thereof.

The machine according to the present invention comprises a hopper 1, shown in FIGS. 2–4, for storage and processing of dough, from which single portions are obtained. The machine also comprises a screw feeder 2 shown in FIG. 5. The structure shown in FIG. 5 comprises an extrusion apparatus indicated by reference numerals 21, 22, 211, 221 in FIG. 1 of the present application and also in FIG. 1 of the Italian patent No. 01253370 issued Aug. 6, 1995.

Figure 5:
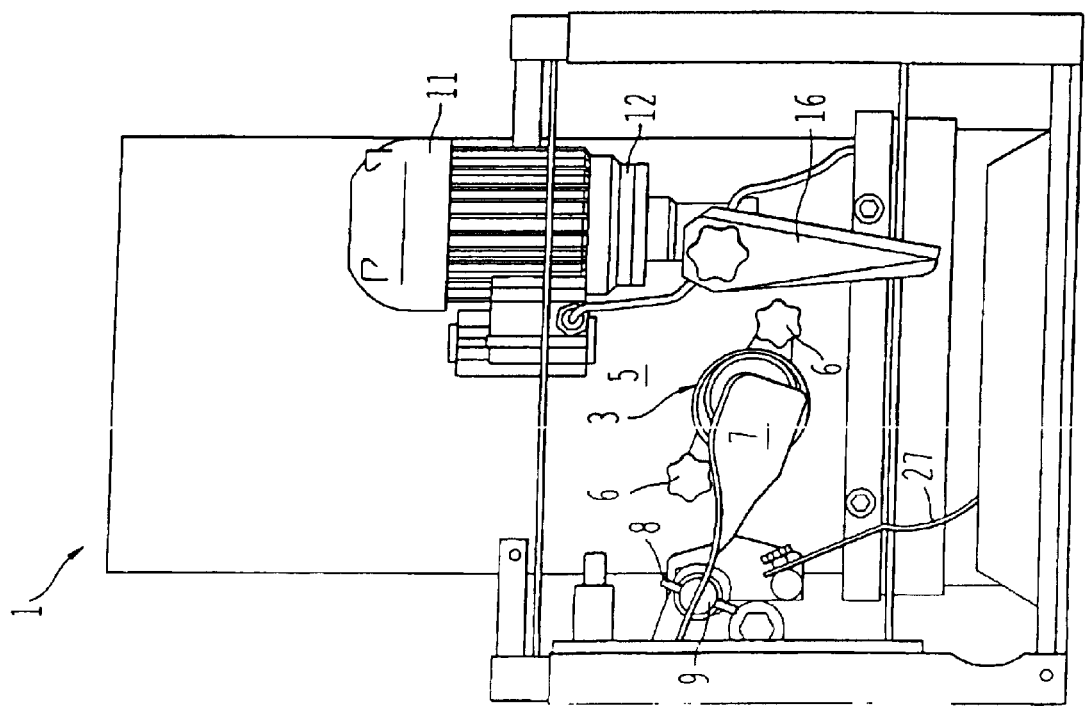
FIG. 5 is a perspective view of a partial interior of the machine according to the invention.

A screw feeder 2 illustrated in FIG. 5 is operated by an electric motor located externally with respect to the machine and not illustrated in the drawings.

A cone-shaped horizontal distributor illustrated in FIGS. 3a, 3b, and 4 is associated with the end of a cover 4 of the screw feeder 2. The distributor 3 allows the dough to leave the machine. Single portions of dough of different weights and dimensions are obtained based on (1) the pressure exerted by the dough fed by the screw feeder 2 within the cover 4 and (2) in cooperation with additional devices described below.

Distributor 3 is fixed to a vertical wall 5 shown in FIGS. 3a, 4, and 5 by suitable fasteners such as the two handwheels 6. The handwheels allow a simply disassembly of a distributor 3 from the machine and the assembly of further different distributors 3 to the machine as explained further below.

Distributor 3 is adapted to produce dough portions having a weight comprised within the range of 0.7–1.5 lb. and even more. Distributor 3 represents apparatus adapted to render the machine compatible with the performance of a machine equipped to produce dough portions substantially lighter than 0.7 lb.

Distributor 3 comprises a coned-shape section outlet. The distributor 3, due to the overall dimensions is provided with a longitudinal axis substantially inclined in a vertical plane with respect to the longitudinal development of the machine as best shown in FIG. 3b and as discussed further below.

The screw feeder 2, which is inside cover 4, and distributor 3 comprise the extrusion apparatus of the machine according to the present invention. The handwheels 6 comprise the interchangeability apparatus adapted to interchange one distributor 3 for other different distributors. The different distributors are adapted to produce dough portions having different weights and dimensions.

A paddle 7 shown in FIGS. 3a and 4 is fixed to a cylindrical block 9 by structure such as a stud 8 retained in a notch in cylindrical block 9. The paddle 7 shown in FIG. 3b is adapted to slide together with the block 9 in a known way per se forward and backward with respect to the longitudinal development of the machine. The handle 10 shown in FIG. 2 is connected to the block 9. The paddle 7 slides forward or backward with respect to the longitudinal development of the machine depending upon the direction of rotation of the handle 10. By adjusting the paddle location, an operator is allowed to select the amount of dough required to form a desired dough portion weight.

Handle 10 provides a weight and/or dimension dough portion selective control apparatus. In addition, paddle 7 is adapted to turn slightly in the forward direction due to the pressure thereon of the dough leaving the distributor 3. The slight turning of the paddle 7 in the forward direction acts on a microswitch (not shown) to actuate an electric motor 11 shown in FIGS. 3a and 4. The electric motor 11 drives a reduction gear 12 to rotate the shaft 13 one revolution (360°) in the direction of the arrow A. A cam 14 is fixed on the shaft 13.

Rotation of the shaft 13 is transmitted to a blade 16 shown in FIG. 3a. The blade 16 represents the dough cutting apparatus of the machine according to the present invention. FIG. 3a shows the rest position of the blade 16. The blade 16 is adapted to rotate in a clockwise direction in order to cut a dough worm leaving distributor 3. FIG. 4 shows the position of the blade 16 after cutting the dough worm.

Another microswitch (not shown) arranged on shaft 13 stops rotation of the shaft 13 in a known way per se after just one revolution.

A square 17 is adapted to cooperate with cam 14. The square 17 is shown in FIG. 5 in its rest position. Square 17 is adapted to rotate on a block 18. The block 18 is fixed to wall 5 of the machine. One end of the square 17 is biased against the cam 14 profile by a spring 24. Upon actuation of the motor 11, rotation is imparted to the shaft 13. The square 17, following the profile of the cam 14, rotates in the direction of the arrow B. Rotation of the square 17 causes, in a known way per se, rotation of shaft 26. Support 27 is fixed on shaft 26.

Support 27 provides support for the dough worm leaving the screw feeder 2 until the dough worm is cut by the blade 16 as explained above. The operator previously selected the dough dimensions by fixing the axial position of block 9 through operation of the handle 10 shown in FIG. 2.

The cam 14, the square 17, the shaft 26, and the support 27 comprise extruded dough portion control apparatus of the machine according to the invention.

The machine operates as follows:

After the dough leaves screw feeder 2, it is conveyed through distributor 3, and it encounters paddle 7. Paddle 7, mounted on block 9, assumes an axial position (in a longitudinal direction of the machine) which corresponds to the choice of a pre-selected dough portion amount. The pre-selection amount is determined by adjusting the handle 10 shown in FIG. 2. The handle cooperates with notches that allow the operator to select a precise dough portion amount.

The paddle 7 turns slightly as soon as the dough worm encounters it. The slight rotation of the paddle 7 closes a first microswitch and actives motor 11. The motor 11 rotates the shaft 13 and cam 14 through 360°. Blade 16 rotates along with cam 14 and shaft 13 and cuts a pre-selected dough portion. The dough portion could fall down into a container (not shown); however, support 27 engages it and keeps it closes to the distributor 3. After the shaft 13 rotates through 360°, a second microswitch (not shown) stops rotation of the shaft 13.

As the dough worn leaves distributor 3, it could fall down or it could bend before the blade 16 cuts it. However, as explained above, in order to avoid such a drawback, the support 27 engages the dough and supports it until blade 16 cuts the pre-selected dough amount. The square 17 rotates in the B direction as soon as the blade 16 has cut the pre-selected dough amount. That is, after the blade 16 has cut the pre-selected dough portion, support 27 rotates clockwise as shown in FIGS. 3a and 4 to release the cut dough portion. The cut dough portion falls down into a container.

The structure of the machine according to the present invention is similar to the machine disclosed and claimed in the cited Italian patent. The main differences between the two machines reside in (1) the distributor 3, which is capable of supplying dough portions heavier than 0.7 lb. (i.e., up to 1.5 lb. and even heavier), (2) the shaft 13, (3) the cam 14, (4) the square 17, (5) the support 27, and (6) the microswitches (not shown) but functionally described.

The transverse cross-sectional dimensions of the distributor 3 decrease along its longitudinal axis from its end coupled to the cover 4 toward its exit end. The distributor 3 is substantially inclined from left to right as illustrated in FIGS. 3a, 3b, and 4. The reason for the inclination is that the blade 16 is provided with the same dimensions as the blade used in the machine disclosed in the cited Italian patent. The inclination allows the blade 16 to cut the entire dough amount that leaves the screw feeder 2 and distributor 3. If the distributor 3 were not provided with the noted inclination, the cutting capacity (i.e., the length) of the cutting blade 16 would have to be increased. As a consequence, the structure of the blade 16 in the new machine would be different than the blade in the machine disclosed in the cited patent.

Therefore, distributor 3 with its inclined longitudinal surface provides distributor structure coupled to the cover 4 in the machine made according to the present invention which is compatible with the distributor structure coupled to the cover 4 of a machine adapted to produce dough portions substantially lower than 0.7 lb.

Figure 1:
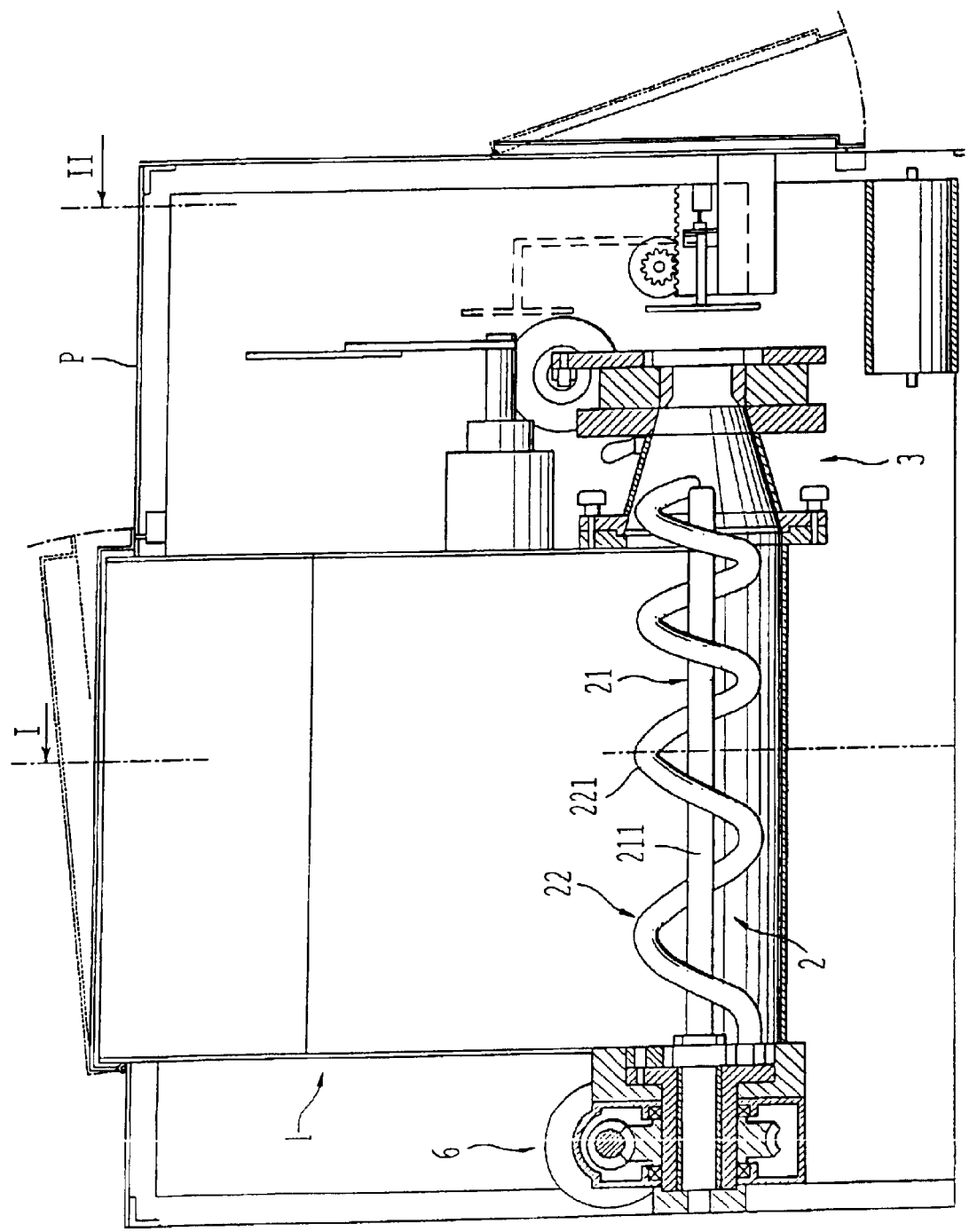
FIG. 1 is a copy of FIG. 1 of Italian patent No. 01253370.

When the machine according to the present invention is to be adapted to a production of dough portions lighter than a weight comprised within a range of about 0.7–1.5 lb. and more, handwheels 6 are unscrewed, distributor 3 is disassembled from the machine frame, and it is exchanged for a different distributor, for instance, the distributor 3 shown in FIG. 1 of the above-cited Italian patent. That distributor allows production of substantially lighter dough portions within the range of about 0.1–0.7 lb.

Therefore, the main advantage offered by the machine according to the present invention is the fact that pizza-restaurants are not require to be equipped with more than one machine for the production of dough portion comprised within a range of 0.1–1.5 lb. The restaurant owners investment cost are therefore reduced.

What is claimed is:

1. A machine comprising:
   (a) a dough feeding hopper;
   (b) a dough cutting apparatus mounted at one side of the longitudinal development of the machine, said dough cutting apparatus has a length corresponding to the length of a cutting apparatus in a machine capable of producing dough portions substantially lighter than 0.7 lb.;
   (c) a dough extrusion apparatus comprising:
      (i) a first dough distributor adapted to render the machine compatible with the performance of the machine capable of producing dough portions substantially lighter than 0.7 lb.;
      (ii) a second dough distributor, interchangeable with said first dough distributor, said second dough distributor comprising a cone having a longitudinal axis which is substantially inclined toward the dough cutting apparatus with respect to the longitudinal development of the machine;

(d) an extruded dough portion control apparatus, wherein:

(e) said first dough distributor is adapted to cooperate with said dough cutting apparatus and said extruded dough portion control apparatus to produce dough portions in the range of 0.1–0.7 lb.; and (f) said second dough distributor, when interchanged with said first dough distributor, is adapted to cooperate with said dough cutting apparatus and with said extruded dough portion control apparatus to produce dough portions heavier than 0.7 lb.

2. A machine according to claim 1, wherein said second dough distributor, when interchanged with said first dough distributor, is adapted to cooperate with said dough cutting apparatus and with said extruded dough portion control apparatus to produce dough portions up to 1.5 lb.

3. A machine according to claim 1, wherein said dough extrusion apparatus comprises a screw feeder.

4. A machine according to claim 1, wherein said second dough distributor cooperates with a dough worm support apparatus.

5. A machine according to claim 4, wherein said dough worm support apparatus supports a dough worm until said cutting apparatus cuts the dough worm, thereby avoiding falling of the dough portion prior to cutting.

6. A machine comprising:

(a) means for feeding dough;

(b) means for cutting the dough mounted at one side of a longitudinal development of the machine, said means for cutting has a length corresponding to the length of a cutter in a machine capable of producing dough portions substantially lighter than 0.7 lb.;

(c) means for extruding the dough, comprising:

(i) first means for distributing the dough adapted to render the machine compatible with the performance of the machine capable of producing dough portions substantially lighter than 0.7 lb.; and (ii) second means for distributing the dough, said second means for distributing the dough comprising a cone having a longitudinal axis which is substantially inclined towards the means for cutting with respect to said longitudinal development of the machine; and (d) means for controlling an extruded portion of the dough, wherein:

(e) said first means for distributing the dough is adapted to cooperate with said means for cutting the dough and said means for controlling an extruded portion to produce dough portions in the range of 0.1–0.7 lb.; and (f) said second means for distributing the dough, when interchanged with said first means for distributing the dough, is adapted to cooperate with said means for cutting the dough and with said means for controlling an extruded portion to produce dough portions heavier than 0.7 lb.

7. A machine according to claim 6, wherein said second means for distributing the dough, when interchanged with said first means for distributing the dough, is adapted to cooperate with said means for cutting the dough and with said means for controlling an extruded dough portion to produce dough portions up to 1.5 lb.

8. A machine according to claim 6, wherein said means for extruding the dough comprises a screw feeder.

9. A machine according to claim 6, wherein said second means for distributing the dough is a horizontal distributor which is adapted to cooperate with a means for supporting a dough worm.

10. A machine according to claim 9, wherein said means for supporting the dough worm supports a dough worm until said means for cutting the dough cuts said dough worm, thereby avoiding falling of the dough portion prior to cutting.

* * * * *